(12) United States Patent
Posamentier (10) Patent No.: US 7,791,478 B2
(45) Date of Patent: Sep. 7, 2010

(54) DUAL BIT ENCODING / DECODING OF RFID SIGNAL

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 1314 days.

(21) Appl. No.: 11/293,628

(22) Filed: Dec. 1, 2005

(65) Prior Publication Data

US 2007/0126582 A1 Jun. 7, 2007

(51) Int. Cl.
*G08B 13/14* (2006.01)
(52) U.S. Cl. .............. 340/572.1; 340/572.2; 340/572.4; 455/190.1; 455/323
(58) Field of Classification Search .............. 340/572.1, 340/572.2, 572.7, 572.4; 370/337; 455/188.1, 455/189.1, 190.1, 323, 324
See application file for complete search history.

(56) References Cited

U.S. PATENT DOCUMENTS

| | | | |
|---|---|---|---|
| 6,313,755 B1 * | 11/2001 | Hetmaniak et al. ....... | 340/856.3 |
| 6,954,448 B2 * | 10/2005 | Farley et al. ................ | 370/337 |
| 7,075,434 B2 * | 7/2006 | Shafir ......................... | 340/571 |
| 7,573,389 B2 * | 8/2009 | Kiyohara ................. | 340/572.7 |
| 2003/0043769 A1 * | 3/2003 | Dolman et al. .............. | 370/337 |

OTHER PUBLICATIONS

Kipnis et al—Apparatus, System and Method for Multi-Class Wireless Receiver—U.S. Appl. No. 11/172,235, filed Jun. 29, 2005.

* cited by examiner

*Primary Examiner*—Davetta W Goins
(74) *Attorney, Agent, or Firm*—Trop, Pruner & Hu, P.C.

(57) ABSTRACT

In some embodiments of a radio frequency identification (RFID) system, multiple bits of data may be encoded at the same time based on a frequency shift key (FSK) modulation technique using multiple frequencies, by permitting any or all of the frequencies to be modulated on a carrier wave at the same time. In some embodiments a parallel but asymmetric down-conversion of the frequencies may allow both frequencies to be detected with identical filters.

19 Claims, 7 Drawing Sheets

DUAL BIT ENCODING / DECODING OF RFID SIGNAL

BACKGROUND

In conventional radio frequency identification (RFID) technology, an RFID tag responds to a signal from an RFID reader by transmitting a response signal in which the RFID tag's binary identification number is encoded. Because most RFID tags are passive (they operate solely on the power harvested from the received signal from the RFID reader), low operational power is a high priority. Accordingly, most RFID tags use a low clock speed internally, since increased clock speed contributes to increased power consumption. Further, to keep the circuitry simple, many conventional RFID tags also use a simple frequency shift key (FSK) modulation technique using two frequencies, i.e., two different frequencies are alternately modulated onto the carrier wave, with one frequency representing a binary '1' and the other frequency representing a binary '0'. While this scheme is simple, inexpensive, and consumes little power, the data rate is limited to the clock rate, which is typically no more than 640 kbits per second, and is frequently much less than that.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

Within the context of this document, "transmitting" a signal from an RFID tag may include either: 1) providing sufficient power to the antenna to generate a signal that radiates out from the antenna, or 2) reflecting a modulated version of the received signal.

As used herein, unless otherwise specified the use of the ordinal adjectives "first", "second", "third", etc., to describe a common object, merely indicates that different instances of like objects are being referred to, and are not intended to imply that the objects so described must be in a given sequence, either temporally, spatially, in ranking, or in any other manner.

Some embodiments of the invention may permit an RFID tag to transmit two bits per clock period by permitting the RFID tag to transmit either, both, or neither of two frequencies during a given clock cycle. These four alternatives may be used to represent the four binary patterns "00", "01", "10", or "11". The specific mapping of the frequencies to each two-bit pattern may be done with any convenient mapping scheme. Some embodiments may decode the two frequencies in parallel with a different band-pass filter for each frequency, while some other embodiments may decode the two frequencies by separately down converting each frequency to the same frequency so that each frequency may be detected with identical filters.

Figure 1:
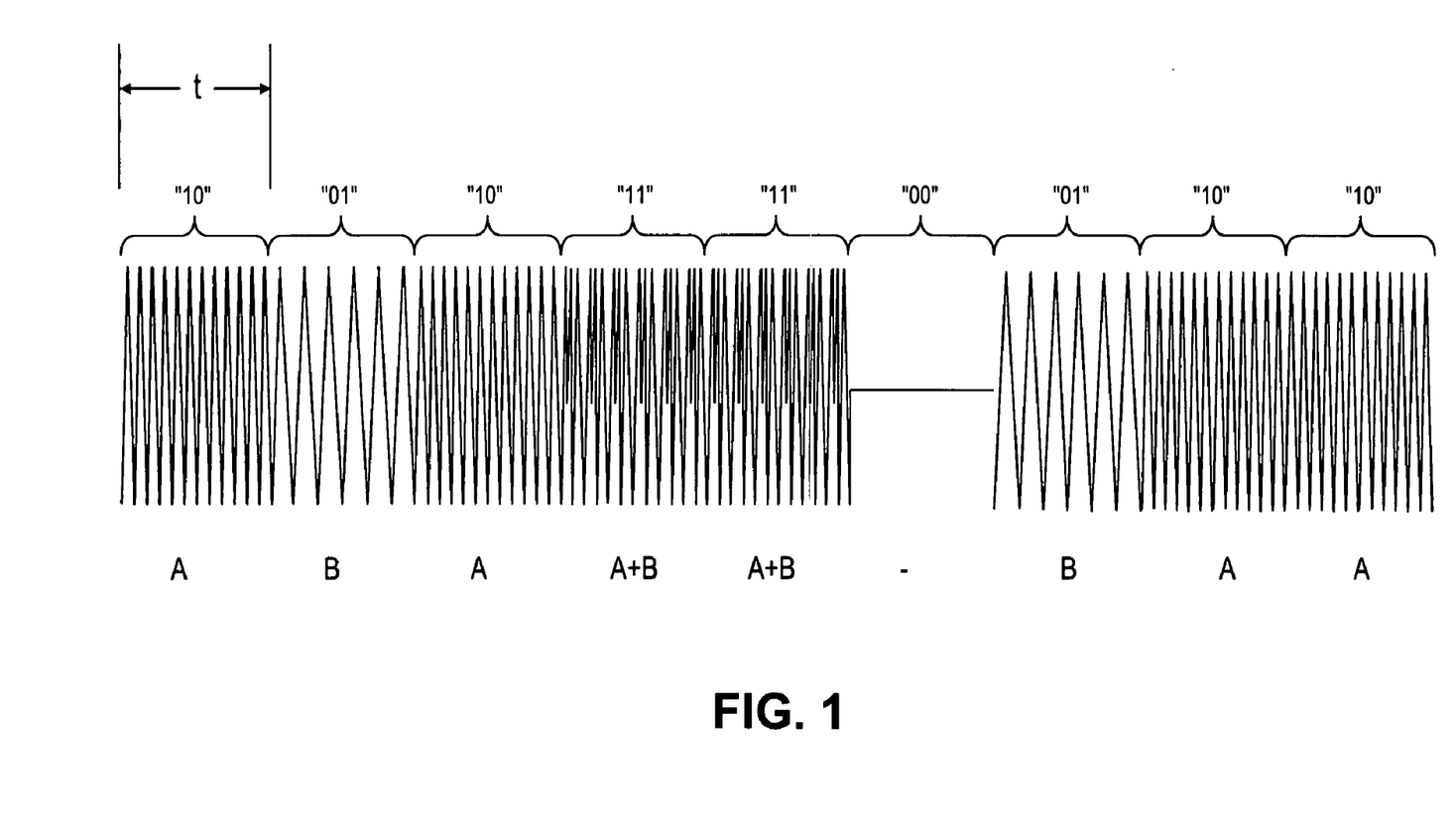
FIG. 1 shows a diagram of dual bit encoding, using two frequencies to simultaneously encode two binary bits in an RFID device, according to an embodiment of the invention.

FIG. 1 shows a diagram of dual bit encoding, using two frequencies to simultaneously encode two binary bits in an RFID device, according to an embodiment of the invention. In the illustrated embodiment, a first frequency A and a second frequency B may be used in one of four possible combinations to represent four different two-bit combinations. The actual frequencies used may be any two frequencies that can be feasibly combined and separated using various circuit techniques. In one embodiment, frequency A may be approximately 3.3 megahertz (MHz) and frequency B may be approximately 2.2 MHz (which are commonly used in RFID devices), but other embodiments may use other frequencies. In the example shown, frequency A represents the first bit in a two-bit sequence, with the presence of frequency A corresponding to a binary "1" in the first bit position and the absence of frequency A corresponding to a binary "0" in the first bit position. Similarly, in the example shown frequency B represents the second bit in the two-bit sequence, with the presence of frequency B corresponding to a binary "1" in the second bit position and the absence of frequency B corresponding to a binary "0" in the second bit position. However, other embodiments may use a different mapping of the presence or absence of the two frequencies A and B to the two bit positions. The length of time that the frequencies A and/or B should remain active and/or absent to represent the two-bit sequence (shown as time period "t" in FIG. 1) may be any feasible time period. In some embodiments time period t may be approximately 1.56 milliseconds, but other embodiments may use other values for time period t (e.g., approximately 3.12 milliseconds, although any other feasible time periods may also be used).

In a conventional RFID system, only a single bit may be represented during a time period t, because frequencies A and B may be required to be present and mutually exclusive (e.g., while transmitting data one frequency or the other must be present, but not both at the same time, and both cannot be absent at the same time). But in various embodiments of the invention, by permitting the two frequencies to be present or absent at the same time, two bits may be encoded in the time previously devoted to one bit.

Figure 2:
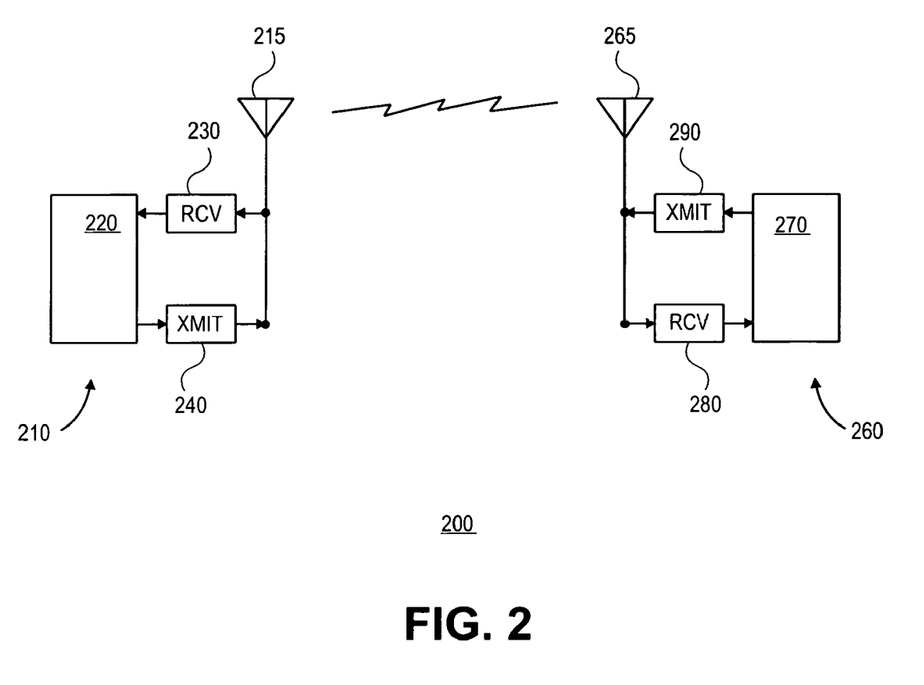
FIG. 2 shows a diagram of an RFID system, according to an embodiment of the invention.

FIG. 2 shows a diagram of an RFID system, according to an embodiment of the invention. The system 200 may comprise an RFID reader 210 and an RFID tag 260 (although the term "system" may be so broad that the RFID reader 210 or the RFID tag 260 each might also be considered a system). RFID reader 210 may comprise receive circuitry 230, transmit circuitry 240, logic circuitry 220 coupled to both the receive circuitry 230 and the transmit circuitry 240, and one or more antennas 215 coupled to both the receive circuitry 230 and the transmit circuitry 240. Logic circuitry 220 may perform various operations (e.g., any, none, or all of: processing received data, processing data to be transmitted, general purpose processing, data storage, etc.) Antenna(s) 215 may comprise any feasible type of antenna, such as but not limited to a dipole antenna.

RFID tag 260 may comprise receive circuitry 280, transmit circuitry 290, logic circuitry 270 coupled to both the receive circuitry 280 and the transmit circuitry 290, and one or more antennas 265 coupled to both the receive circuitry 280 and the transmit circuitry 290. Antenna(s) 265 may comprise any feasible type of antenna, such as but not limited to a dipole antenna. Logic circuitry 270 may perform various operations (e.g., any, none, or all of: processing received data, processing data to be transmitted, general purpose processing, data storage, etc.). Operationally, RFID reader 210 may transmit an inquiry signal that is received by RFID tag 260, which may respond by transmitting a response signal that is received by RFID reader 210. In some embodiments the RFID tag may respond only if the received inquiry signal meets certain requirements, such as but not limited to one or more of: 1) the received inquiry signal is stronger than a particular value, 2) the received inquiry signal lasts longer than a particular time, 3) the received inquiry signal is at a particular frequency, 4) the received inquiry signal encodes an address or other code to which the particular RFID tag is supposed to respond, 5) etc. The response from RFID tag 260 may include various types of information, such as but not limited to one or more of: 1) an identification code for the RFID tag, 2) other stored data, 3) data acquired from another device, 4) information about the communications process, 5) etc. The information may be segmented into two-bit segments, each two-bit segment to be encoded into a combination of frequencies transmitted at the same time.

Figure 3:
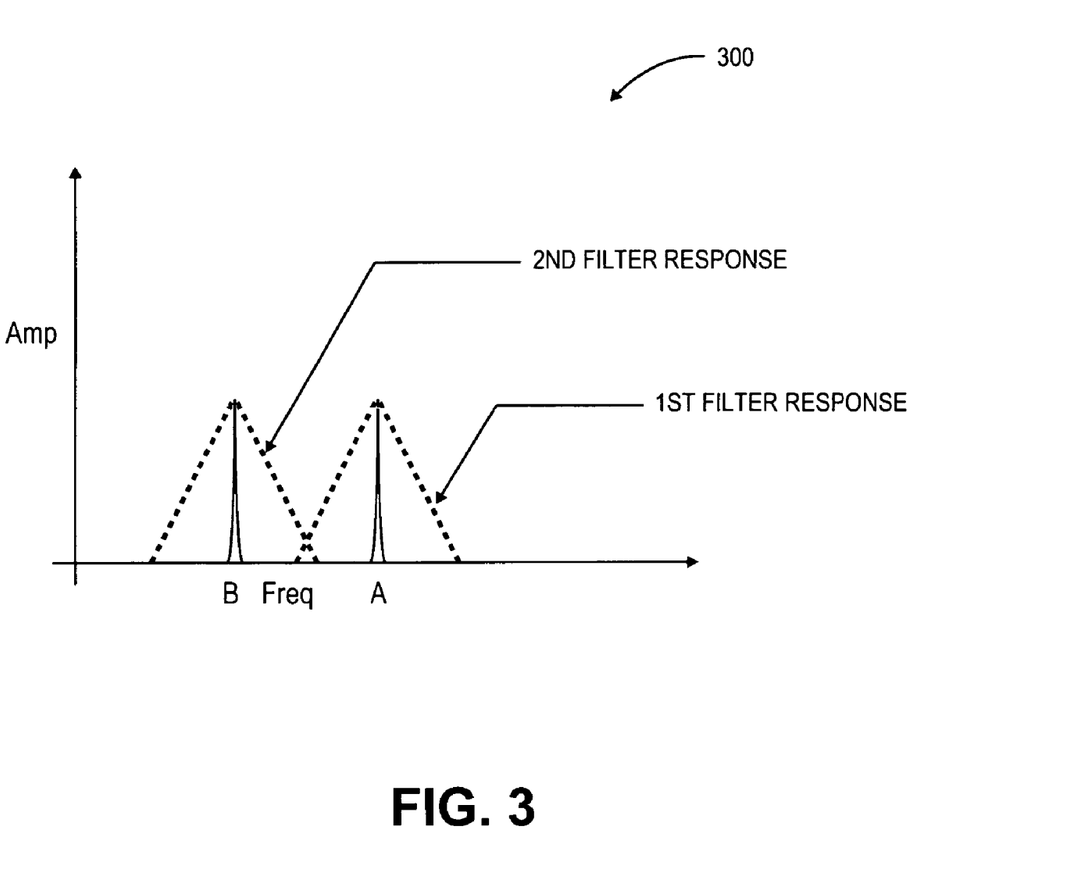
FIG. 3 shows a diagram of signal frequencies within receive circuitry, according to an embodiment of the invention.

FIG. 3 shows a diagram of signal frequencies within receive circuitry, according to an embodiment of the invention. In some embodiments the two frequencies A and B may correspond to the 3.3 and 2.2 MHz frequencies, respectively, that were previously discussed, but in other embodiments other frequencies may be used. In the illustrated example, both frequencies are shown with a typical shape, with a peak amplitude at the center frequency and rapidly declining amplitude as the frequency deviates from that center. Also shown, with dashed lines, are approximate band pass response characteristics of two filters, each of which is designed to pass one of the two frequencies while effectively filtering out any frequencies that significantly deviate from that center frequency. (Note: the response curve of an actual filter might br curved rather than the straight-sided cone shape shown. However, the exact shape of the filter response curve is not important to a description of the various embodiments of the invention, so the cone shape has been used for graphical simplicity.) Two band pass characteristics are shown, one for the center frequency A and the other for the center frequency B. Thus, two filters with appropriately chosen characteristics may be used to detect the presence of either, both, or neither of the two frequencies.

In some embodiments, the two frequencies may be modulated onto a carrier wave (e.g., 3.3 MHz and 2.2 MHz signals may both be modulated onto a 900 MHz carrier wave for radio frequency transmission, and then demodulated at the receiving device two reproduce the 3.3 MHz and 2.2 MHz signals). Although specific frequencies are given in this and other examples, these are intended to serve purely as examples, and should not be inferred to be a limitation on any frequencies that might be used in various embodiments of the invention.

Figure 4:
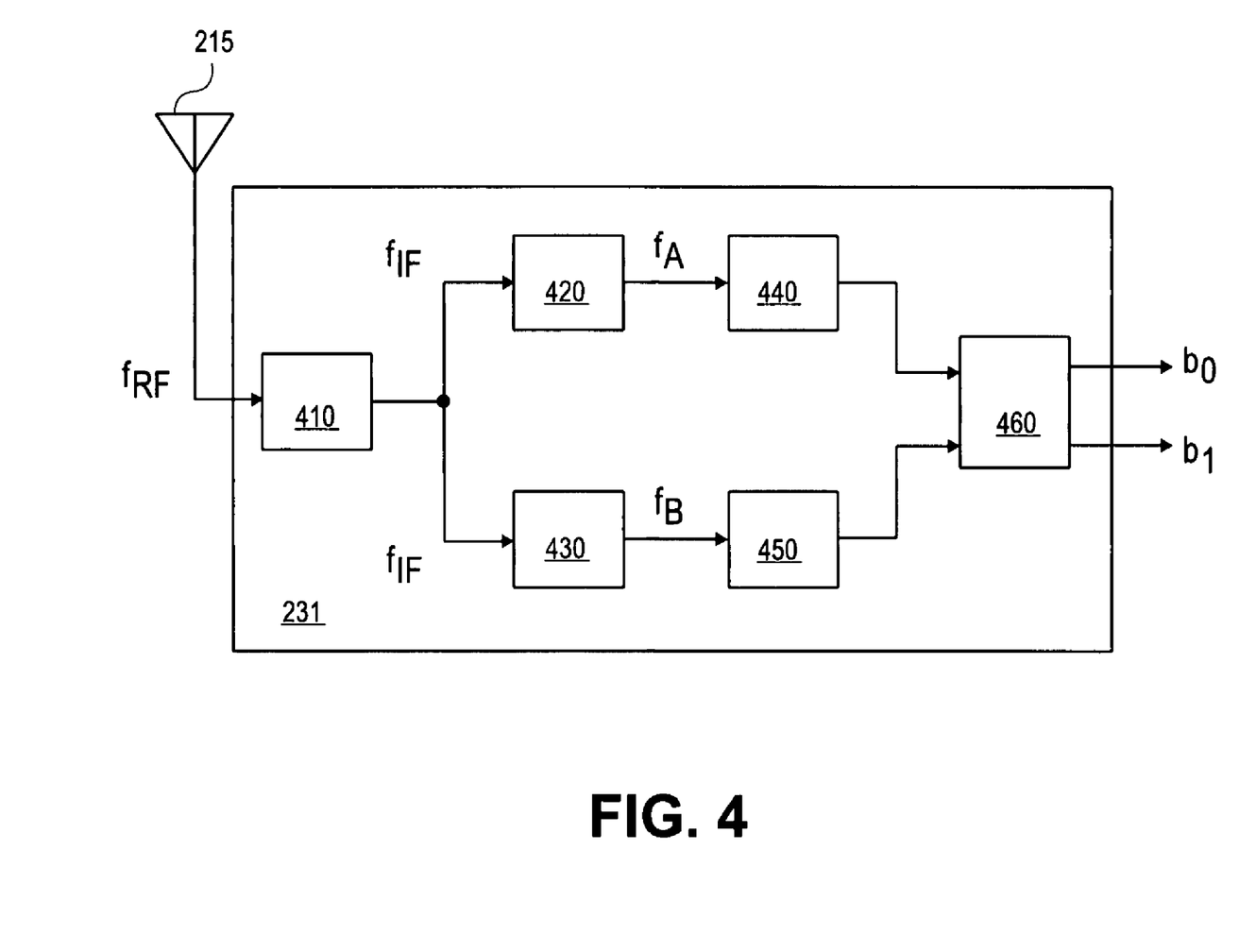
FIG. 4 shows receive circuitry, according to an embodiment of the invention.

FIG. 4 shows receive circuitry, according to an embodiment of the invention. In some embodiments, the overall receiver architecture may be super-heterodyne or homodyne per the specific application's needs, but other embodiments may use other techniques. In the illustrated embodiment, receive circuitry 231 (which in some embodiments may be a version of receive circuitry 230 of FIG. 2) may comprise a down converter 410 (e.g., comprised of a mixer and a local oscillator), filters 420 and 430, detectors 440 and 450, and digital bit demultiplexing circuit 460. Down converter 410 may down convert the modulated carrier wave $f_{RF}$ received through antenna 215, and separate out the resulting intermediate frequency $f_{IF}$, which may be modulated with the frequencies $f_A$ and/or $f_B$ during times when one or both of those frequencies are present in the modulation of the RF carrier wave. A filter 420 may be used to pass only frequency $f_A$ but substantially remove all other components of the signal, including frequency $f_B$. Similarly, a filter 430 may be used to pass frequency $f_B$, but substantially remove all other components of the signal, including frequency $f_A$. A detector 440 may be used to detect the frequency $f_A$ at the output of filter 420, and a detector 450 may be used to detect the frequency $f_B$ at the output of filter 430. In some embodiments, each of detectors 440 and 450 may be a low pass filter combined with a frequency envelope power detector (e.g., a thermopile or Shottky Diode detector) that merely detects the presence of sufficient energy at the output of the corresponding filter 420 or 430, but other embodiments may use other techniques.

The outputs of detectors 440 and 450 may then go to a digital demultiplexing or mapping circuit 460 to produce a two-bit binary value consisting of bits $b_0$ and $b_1$. In embodiments in which the mapping is a simple one-to-one conversion, i.e., the output of each detector 440 or 450 represents one of the two bits $b_0$ or $b_1$, then mapping circuit 460 may be as simple as a buffer, latch, inverter, or some combination of those, for each bit. In other embodiments in which the mapping does not represent a direct correspondence between the output of each detector and a particular bit, then mapping circuit 460 may be more complex and may be implemented in a variety of ways (e.g., a logic table, a memory, a gate array, etc).

Figure 5:
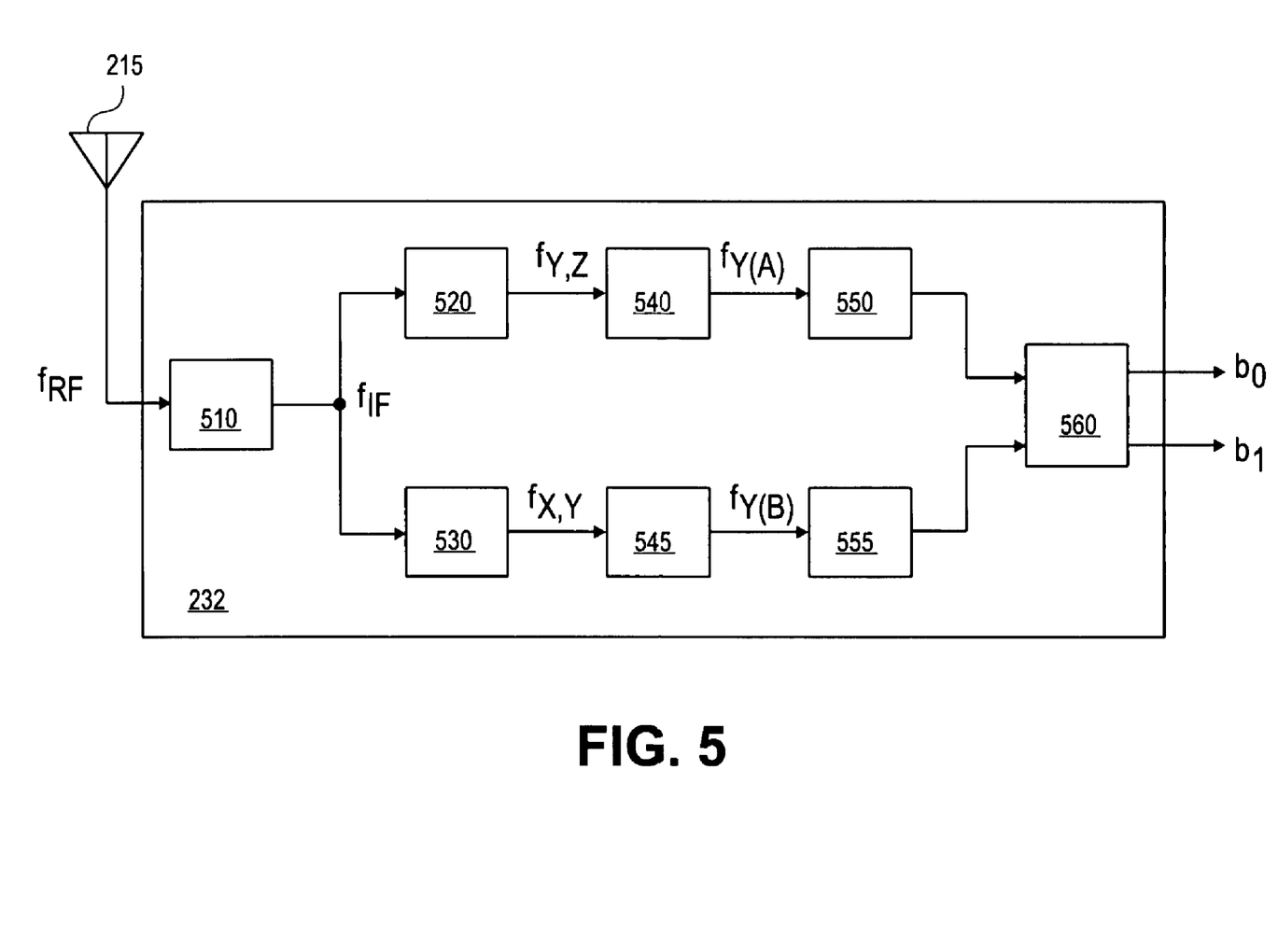
FIG. 5 shows receive circuitry, according to another embodiment of the invention.

FIG. 5 shows receive circuitry, according to another embodiment of the invention. In the illustrated example, receive circuitry 232 (which in some embodiments may be a version of receive circuitry 230 of FIG. 2) may comprise an initial down converter 510 (e.g., comprised of a mixer and a local oscillator), down converters 520 and 530 (e.g., each with a separate mixer and local oscillator of its own), filters 540 and 545, detectors 550 and 555, and digital bit demultiplexor circuit 560. Down converter 510 may down convert the carrier wave $f_{RF}$ received through antenna 215 to produce an IF signal, still modulated with the frequencies $f_A$ and/or $f_B$ during times when one or both of those frequencies are present in the modulation of the RF signal. Down converter 520 may be used to further reduce the IF signal down to a modified baseband, such that the IF modulation components A and B have been converted to baseband frequencies Y and Z, respectively. Similarly, down converter 530 may be used to further reduce the IF signal down to a differently modified baseband, such that the IF modulation components A and B have been converted to baseband frequencies X and Y, respectively. In this manner, the presence of frequency A in the original signal will produce frequency Y at the output of down converter 520, while the presence of frequency B in the original signal will produce frequency Y at the output of down converter 530. Other frequencies may also be present at the output of the down converters 520, 530. Identical filters 540 and 545 may then be used to effectively filter out all but frequency Y from both signal paths. Detector circuits 550 and 555 may then be used to detect the presence of frequency Y at the outputs of filters 540, 545, respectively, which will in turn indicate the presence of frequencies A and/or B, respectively, in the original signal. Therefore, the indication of frequencies A and B, in any combination, may be passed on to digital demultiplexing circuit 560, which may produce the appropriate bits $b_0$, $b_1$ as previously described.

In some embodiments, one of the down conversions may be such that if the higher of the two initial frequencies (e.g., frequency A) is converted to frequency Y, the lower of the two initial frequencies (e.g., frequency B) may be effectively converted to zero MHz, effectively removing it from the down converted signal. At the same time, the other of the down conversions may be such that (lower) frequency B is converted to frequency Y, leaving frequency A converted to some frequency higher than frequency Y. However, in the first case a subsequent low pass filter may be used to identify the presence of frequency Y, while in the second case a similar low pass filter may be used to simultaneously filter out the frequency that is higher than frequency Y, and also identify the presence of frequency Y, thus simplifying the circuitry and reducing power consumption of the overall circuitry.

Figure 6:
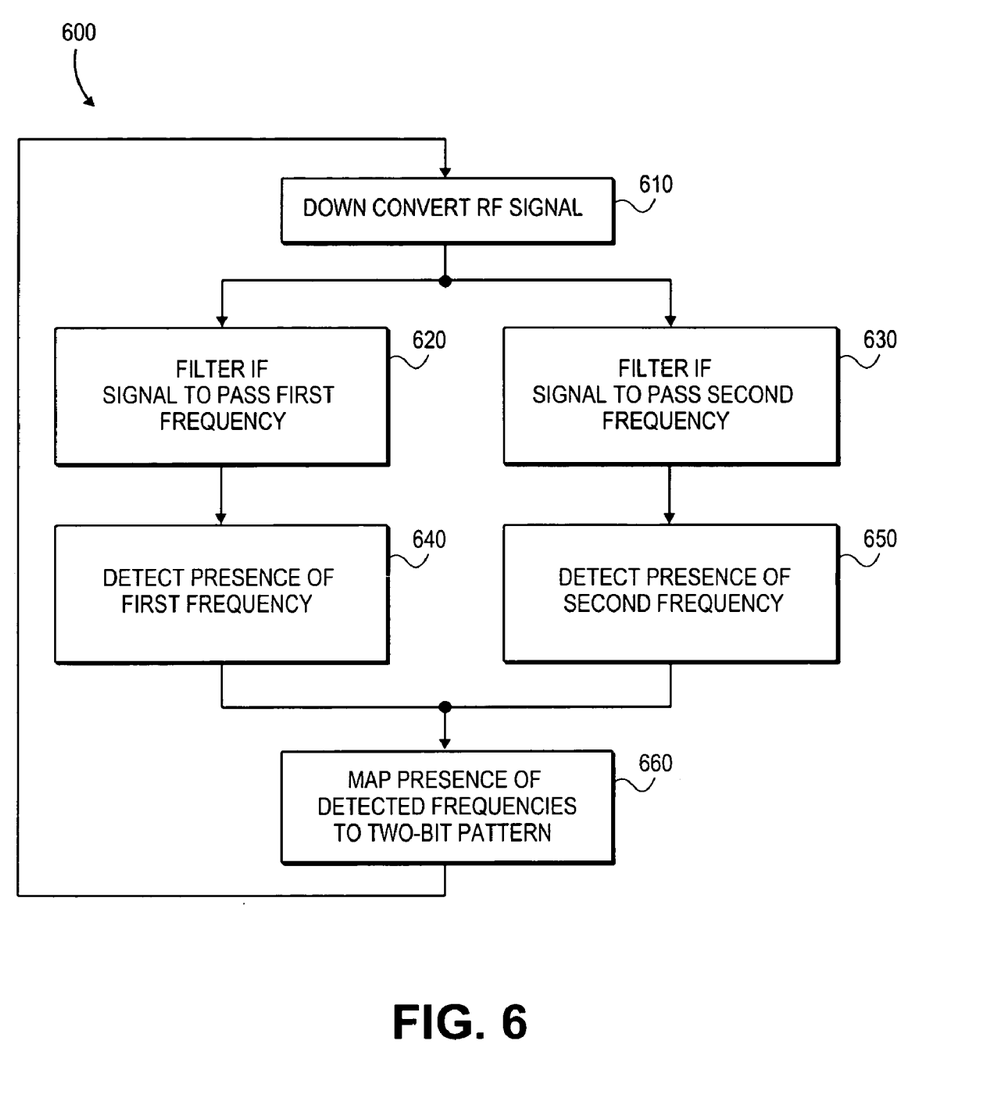
FIG. 6 shows a flow diagram of a method of operation of the circuitry of FIG. 4, according to an embodiment of the invention.

FIG. 6 shows a flow diagram of a method of operation of the circuitry of FIG. 4, according to an embodiment of the invention. In flow diagram 600, at 610 an RF signal is down converted to produce an IF signal. At any given time, this IF signal may be modulated with either, both, or neither of the two original frequencies A, B, based on the timing with which they were previously modulated onto the RF signal. At 620 this IF signal may be filtered by a filter that is designed to substantially pass a first one of the two frequencies but substantially not pass a second one of the two frequencies. At 640 a detector may determine if the first frequency passed through the filter at 620, indicating that the first frequency was present in the modulation of the IF signal.

Simultaneously with operations 620 and 640, at 630 the IF signal may be filtered by a second filter that is designed to substantially pass the second frequency but substantially not pass the first frequency, while at 650 another detector may determine if the second frequency passed through the filter at 630, indicating that the second frequency was present in the modulation of the IF signal. These two determinations may be mapped to a two-bit combination at 660, with the four possible combinations of the presence/absence of each of the first/second frequencies corresponding to the four possible combinations of two binary bits. The operations of flow diagram 600 may be performed continuously during times when a valid RF signal is being received.

Figure 7:
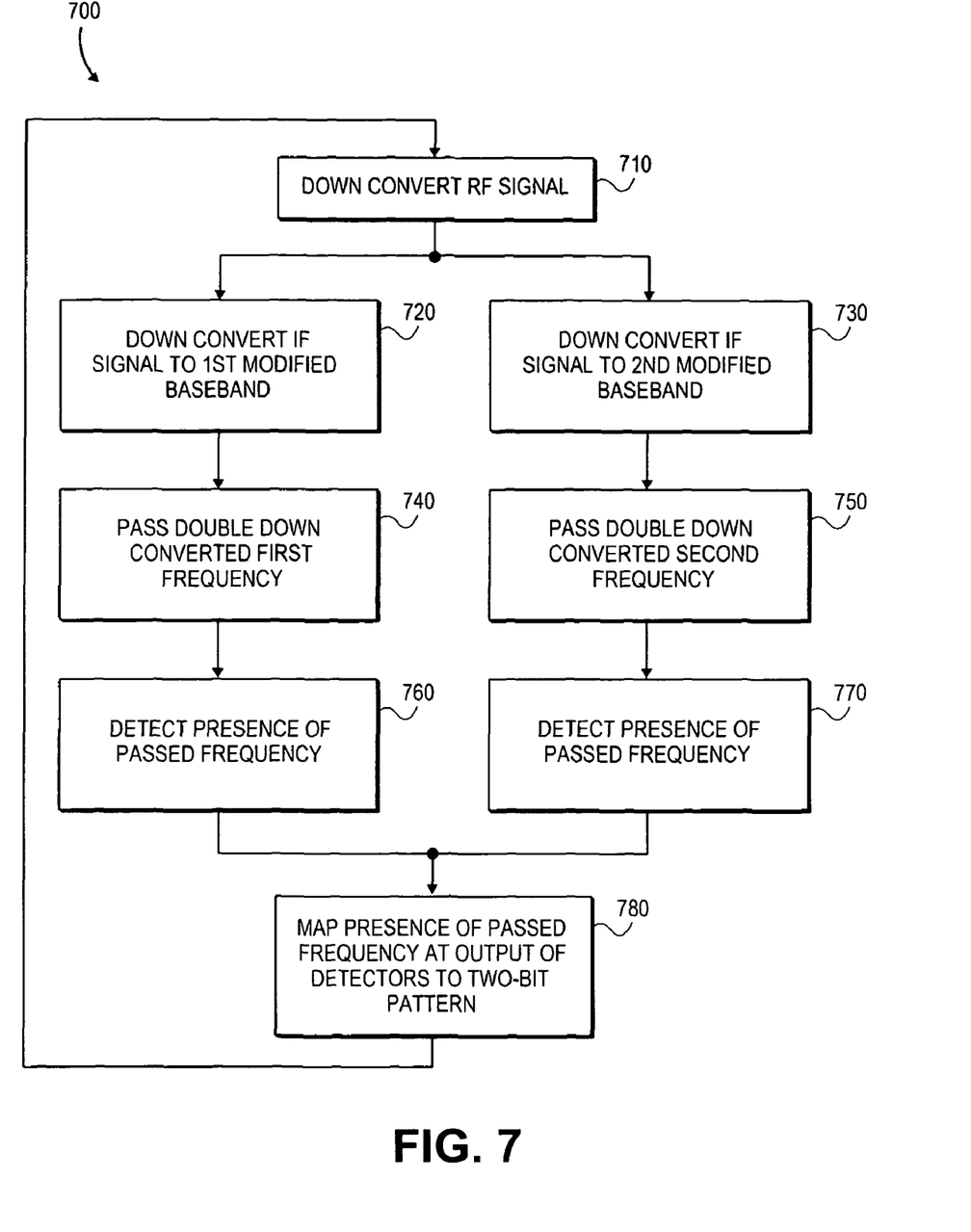
FIG. 7 shows a flow diagram of a method of operation of the circuitry of FIG. 5, according to another embodiment of the invention.

FIG. 7 shows a flow diagram of a method of operation of the circuitry of FIG. 5, according to an embodiment of the invention. In flow diagram 700, at 710 an RF signal is down converted to produce an IF signal which may be modulated with two particular frequencies that had previously been modulated onto the RF signal. At any given time, the IF signal may contain either, both, or neither of these two frequencies, based on the timing with which they were previously modulated onto the RF signal. At 720 the IF signal may be down converted in such a manner that the first frequency is converted to a third frequency. Simultaneously, at 730 the IF signal may be down converted by a different amount such that the second frequency is also converted to the third frequency. The signals at the outputs of the down converters at 720, 730 are referred to herein as modified baseband signals, since each of these signals may be a frequency-shifted version of the original signal rather than the original signal itself. From that point, operations 740, 750, 760, 770, and 780 may correspond approximately with operations 620, 630, 640, 650, and 660, respectively, except that the two filters performing operations 740 and 750 may be designed to pass substantially the same frequency (e.g., the previously mentioned third frequency). The operations of flow diagram 700 may be performed continuously during times when a valid RF signal is being received.

Since the operations previously described may be used to decode a long multi-bit sequence two bits at a time, a time period may be defined that determines when the next two bits of the longer bit sequence are being simultaneously received within the modulated RF signal. In some embodiments, a transition from one two-bit value to another two-bit value may be used to resynchronize on the transitions in the incoming data, but other embodiment may use other techniques.

The foregoing descriptions describe two alternative techniques for decoding the received signal. In the first, parallel filters with different pass band characteristics may be used to separately isolate, and identify the presence of, the two frequencies in question. In the second, both frequencies may be separately down converted to the same frequency, and then identical filters used to identify the presence of each. However, other embodiments may use a combination of elements of these two techniques. For example, double down conversion may be used even if the resulting frequencies are still different from one another and require filters with different pass band characteristics. Other combinations of techniques may also be used, without departing from the intended scope of some embodiments of the invention.

Examples have been given of an RFID receive circuit (e.g., receive circuit 230 of RFID reader 210 in FIG. 2) that decodes a two-bit sequence that had previously been encoded with two frequencies in the combinations shown. Similarly, an RFID transmit circuit (e.g., transmit circuit 290 of RFID tag 260 in FIG. 2) may preform the actual encoding, to create the signals that are subsequently decoded by the receive circuit. Such a transmit circuit may, for example, convert a two-bit binary value into any of the four combinations of two frequencies, and modulate those frequencies onto a carrier wave for transmission. The basic principles of modulating various frequencies onto a higher-frequency carrier wave are known and are not repeated here to avoid obscuring the important elements of various embodiments of the invention.

Although the examples described herein use two frequencies to encode/decode two bits at a time, other embodiments may use three or more frequencies to encode/decode three or more bits at a time, by extending the techniques described herein to more than two signal paths. Such an expansion beyond two frequencies/bits should be within the ability of a person of ordinary skill in the art, without requiring undue experimentation.

The foregoing description is intended to be illustrative and not limiting. Variations will occur to those of skill in the art.

Those variations are intended to be included in the various embodiments of the invention, which are limited only by the spirit and scope of the following claims.

What is claimed is:

1. An apparatus, comprising a radio frequency identification (RFID) device capable of processing a radio frequency (RE) signal modulated with a first frequency and a second frequency, the two frequencies representing two-bit combinations in any of these four combinations:
   a) the first frequency present and the second frequency absent;
   b) the first frequency absent and the second frequency present;
   c) the first and second frequencies both present;
   d) the first and second frequencies both absent; and
   wherein the RFID device comprises:
   a first down converter to convert the RF signal to an intermediate frequency (IF) signal that may be modulated with the first and second frequencies;
   a second down converter coupled to the first down converter to convert the IF signal to first base band signal in which the first frequency is represented by a particular frequency at a first output;
   a third down converter coupled to the first down converter to convert the IF signal to second base band signal in which the second frequency is represented by the particular frequency at a second output;
   a first filter coupled to the second down converter and a first detector coupled to the first filter, the first filter and the first detector to detect a presence of the particular frequency at the first output;
   a second filter coupled to the third down converter and a second detector coupled to the second filter, the second filter and the second detector to detect a presence of the particular frequency at the second output.

2. The apparatus of claim 1, wherein the RFID device is capable of modulating the RF signal for transmission through an antenna.

3. The apparatus of claim 1, wherein the RFID device is capable of demodulating the RF signal after the RF signal has been received through an antenna.

4. The apparatus of claim 1, wherein the RFID device comprises an RFID tag.

5. The apparatus of claim 1, wherein the RFID device comprises:
   a down converter to convert the RF signal to an intermediate frequency (IF) signal that may be modulated with the first and second frequencies;
   a first filter coupled to the down converter and a first detector coupled to the first filter, the first filter and the first detector to detect if the IF signal is modulated with the first frequency; and
   a second filter coupled to the down converter and a second detector coupled to the second filter, the second filter and the second detector to detect if the IF signal is modulated with the second frequency.

6. The apparatus of claim 5, further comprising a circuit to convert outputs of the first and second detectors to a two-bit binary value.

7. The apparatus of claim 1, further comprising a circuit coupled to the first output and the second output to convert the presence of the particular frequency at the first output and the presence of the particular frequency at the second output to a two-bit binary value.

8. The apparatus of claim 1, wherein the first filter is a low pass filter.

9. The apparatus of claim 1, wherein the second filter is a low pass filter.

10. A method, comprising:
    demodulating, in a radio frequency identification (RFID) device, a carrier wave modulated with first and second frequencies;
    detecting a presence of the first frequency and a presence of the second frequency in any of the combinations of
    the first frequency but not the second frequency;
    the second frequency but not the first frequency;
    both the first and second frequencies; and
    neither the first nor the second frequency;
    converting the detected combination into a two-bit binary value, wherein each of the four combinations represents a different two-bit binary value; and
    wherein said demodulating comprises down converting the carrier wave to an intermediate frequency modulated with the first and second frequencies.

11. The method of claim 10, further comprising repeating said demodulating, detecting, and converting to detect an identification code for an RFID tag.

12. The method of claim 10, where said demodulating further comprises down converting the intermediate frequency.

13. An apparatus, comprising a radio frequency identification (RFID) device capable of processing a radio frequency (RF) signal modulated with a first frequency and a second frequency, the two frequencies representing two-bit combinations in any of these four combinations:
    a) the first frequency present and the second frequency absent;
    b) the first frequency absent and the second frequency present;
    c) the first and second frequencies both present;
    d) the first and second frequencies both absent;
    wherein the RFID device comprises:
    a down converter to convert the RF signal to an intermediate frequency signal that may be modulated with the first and second frequencies;
    a first filter coupled to the down converter and a first detector coupled to the first filter, the first filter and the first detector to detect if the IF signal is modulated with the first frequency; and
    a second filter coupled to the down converter and a second detector coupled to the second filter, the second filter and the second detector to detect if the IF signal is modulated with the second frequency.

14. The apparatus of claim 13, further comprising a circuit to convert outputs of the first and second detectors to a two-bit binary value.

15. The apparatus of claim 13, comprising:
    a first down converter to convert the RF signal to an intermediate frequency (IF) signal that may be modulated with the first and second frequencies;
    a second down converter coupled to the first down converter to convert the IF signal to first base band signal in which the first frequency is represented by a particular frequency at a first output;
    a third down converter coupled to the first down converter to convert the IF signal to second base band signal in which the second frequency is represented by the particular frequency at a second output;
    a first filter coupled to the second down converter and a first detector coupled to the first filter, the first filter and the first detector to detect a presence of the particular frequency at the first output;

a second filter coupled to the third down converter and a second detector coupled to the second filter, the second filter and the second detector to detect a presence of the particular frequency at the second output.

16. The apparatus of claim 15, further comprising a circuit coupled to the first output and the second output to convert the presence of the particular frequency at the first output and the presence of the particular frequency at the second output to a two-bit binary value.

17. The apparatus of claim 15, wherein the first filter is a low pass filter.

18. The apparatus of claim 15, wherein the second filter is a low pass filter.

19. The apparatus of claim 1, wherein the RFID device comprises an RFID reader.

* * * * *

UNITED STATES PATENT AND TRADEMARK OFFICE
CERTIFICATE OF CORRECTION

PATENT NO. : 7,791,478 B2  Page 1 of 1
APPLICATION NO. : 11/293628
DATED : September 7, 2010
INVENTOR(S) : Joshua Posamentier It is certified that error appears in the above-identified patent and that said Letters Patent is hereby corrected as shown below:

Column 7:
Line 7, "(RE)" should be --(RF)--.

Column 8:
Line 38, "frequency signal" should be --frequency (IF) signal--.

Signed and Sealed this

Second Day of November, 2010

David J. Kappos
*Director of the United States Patent and Trademark Office*